United States Patent
Luo

(10) Patent No.: US 7,509,924 B2
(45) Date of Patent: Mar. 31, 2009

(54) ANGLE-ADJUSTABLE DEVICE BETWEEN TWO TUBES USED AS A PLAY PLACE FOR PETS

(75) Inventor: Yih Wenn Luo, Tainan (TW)

(73) Assignee: Ying Yeeh Enterprise Co., Ltd., Tainan (TW)

(*) Notice: Subject to any disclaimer, the term of this patent is extended or adjusted under 35 U.S.C. 154(b) by 332 days.

(21) Appl. No.: 11/642,460

(22) Filed: Dec. 19, 2006

(65) Prior Publication Data

US 2008/0141947 A1    Jun. 19, 2008

(51) Int. Cl.
*A01K 1/00* (2006.01)
*A01K 1/03* (2006.01)

(52) U.S. Cl. ...................... 119/416; 119/452

(58) Field of Classification Search ............... 119/416, 119/417, 452–456, 482, 706; 403/87, 90, 403/91, 98, 113, 114, 116; 446/99, 102, 446/104, 120, 121, 124; 285/144.1, 261, 285/293.1; D30/113, 119
See application file for complete search history.

(56) References Cited

U.S. PATENT DOCUMENTS

| 3,902,482 | A | * | 9/1975 | Taylor .......................... 602/16 |
| 5,215,338 | A | * | 6/1993 | Kimura et al. ........... 285/154.2 |
| 6,253,712 | B1 | * | 7/2001 | Johnson ...................... 119/707 |
| 6,668,757 | B2 | * | 12/2003 | Marchioro .................. 119/452 |
| 2001/0052328 | A1 | * | 12/2001 | Marchioro .................. 119/416 |
| 2002/0101075 | A1 | * | 8/2002 | Park et al. ...................... 285/7 |

FOREIGN PATENT DOCUMENTS

| JP | 11210198 | A | * | 8/1999 |
| JP | 2000017809 | A | * | 1/2000 |

* cited by examiner

*Primary Examiner*—Derris H Banks
*Assistant Examiner*—Danielle Bates
(74) *Attorney, Agent, or Firm*—Pro-Techtor Int'l Services

(57) ABSTRACT

An angle-adjustable device between two tubes used as a play place for pets comprises a first connecting unit connected to a first tube, a linking body connected to the first connecting unit, and a second connecting unit connected to a second tube and the linking body. By such arrangements, a pipe is formed as a play place for the pets, and the shape of the pipe is adjustable.

8 Claims, 8 Drawing Sheets

ANGLE-ADJUSTABLE DEVICE BETWEEN TWO TUBES USED AS A PLAY PLACE FOR PETS

BACKGROUND OF THE INVENTION

1. Field of the Invention

The present invention relates to an angle-adjustable device between two tubes used as a play place for pets, and more particularly to an angle-adjustable device between two tubes used as a play place for pets, which is connected between the tubes to adjust the angle between the tubes.

2. Description of the Prior Art

Referring to FIG. 1, conventional tubes 100 and 100a used as a play place for pets are provided with a annular flange 101 and 101a respectively that are engaged with a frame 200, so that the tubes 100 and 100a are connected to each other, thus pets can play in the tubes 100 and 100a. However, the tubes 100 and 100a are connected by the frame 200 to form a straight pipe, and the angle between the tubes 100 and 100a is unadjustable, and the path that the pets move is fixed and unchangeable.

The present invention has arisen to mitigate and/or obviate the afore-described disadvantages.

SUMMARY OF THE INVENTION

The primary objective of the present invention is to provide an angle-adjustable device between two tubes used as a play place for pets comprises a first connecting unit, a linking body connected to the first connecting unit, and a second connecting unit connected to the linking body. The angle between the first and the second connecting unit are adjustable.

The first connecting unit and the second connecting unit are connected to a first tube and a second tube respectively to form a pipe, thus enabling the pets to play in the pipe.

The first connecting unit includes two protruded posts for inserting into two round holes of the linking body and two holes of the second connecting unit, thereby, the first and the second connecting unit are rotatable.

The second connecting unit includes a plurality of ratchets for engaging with engaging teeth of the first connecting unit, thus fixing the first connecting unit and the second connecting unit.

The second connecting unit includes guiding grooves for insertion of protruded blocks of the linking body to restrict the rotating angle of the second connecting unit.

The first connecting unit includes two half tubes, each half tube having engaging blocks, engaging grooves, positioning posts and positioning holes, and the half tubes can be combined together.

The second connecting unit includes two half tubes, each half tube having engaging blocks, engaging grooves, positioning posts and positioning holes, and the half tubes can be combined together.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
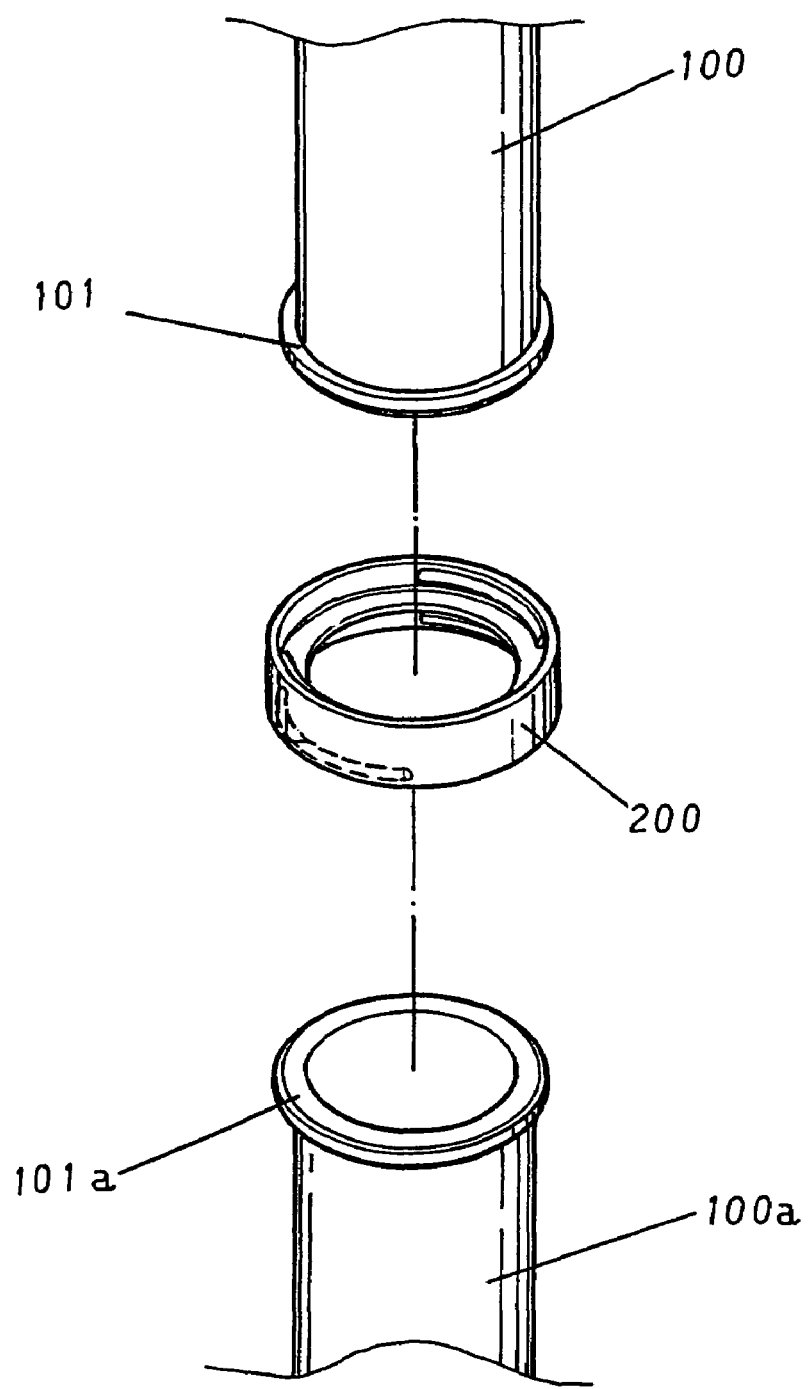
FIG. 1 is an exploded view of conventional tubes and a frame.
Figure 2:
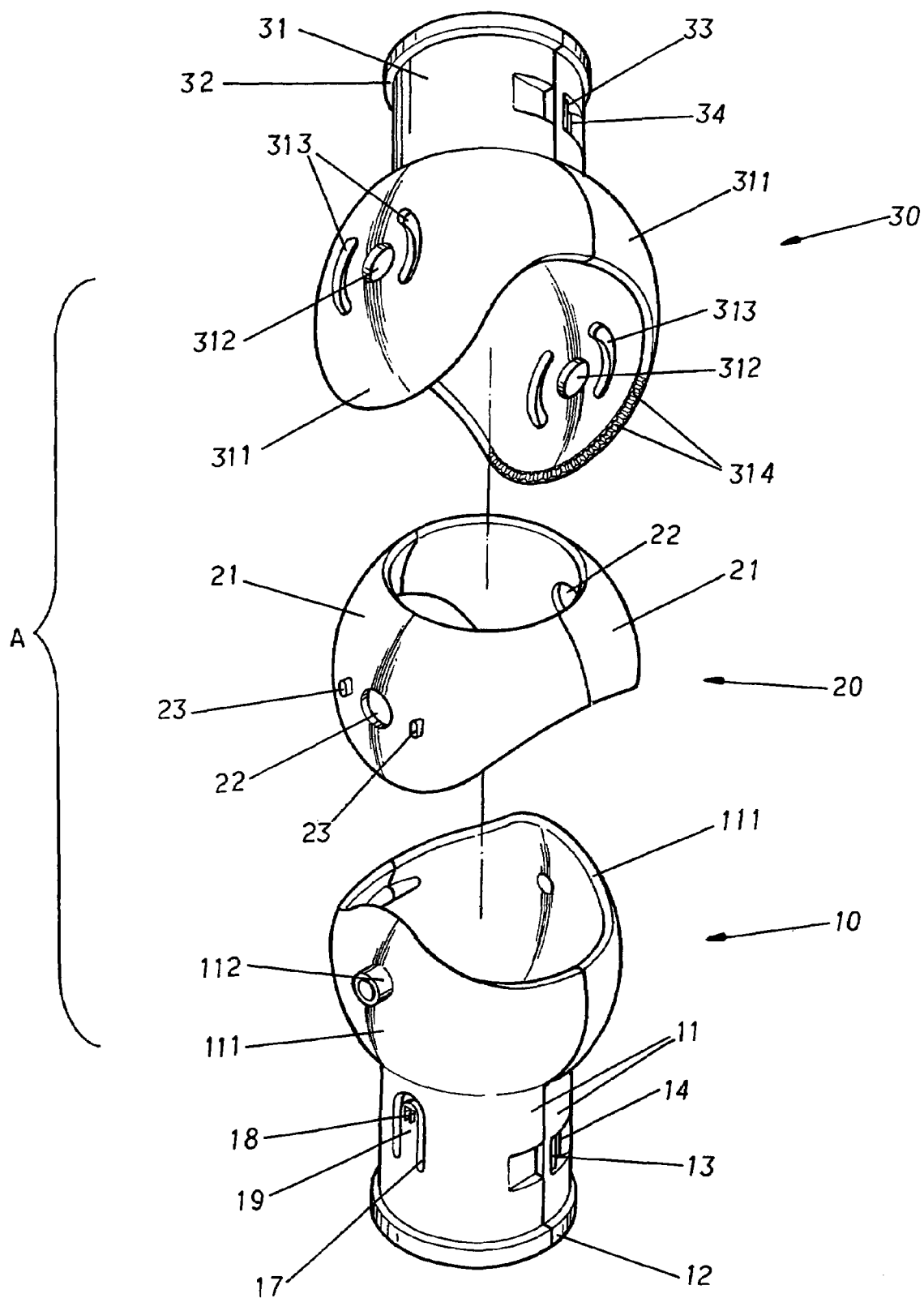
FIG. 2 is an exploded view of an angle-adjustable device in accordance with the present invention.

Referring to FIG. 2, an angle-adjustable device A between two tubes used as a play place for pets in accordance with the present invention comprises a first connecting unit 10, a linking body 20 and a second connecting unit 30.

Figure 3:
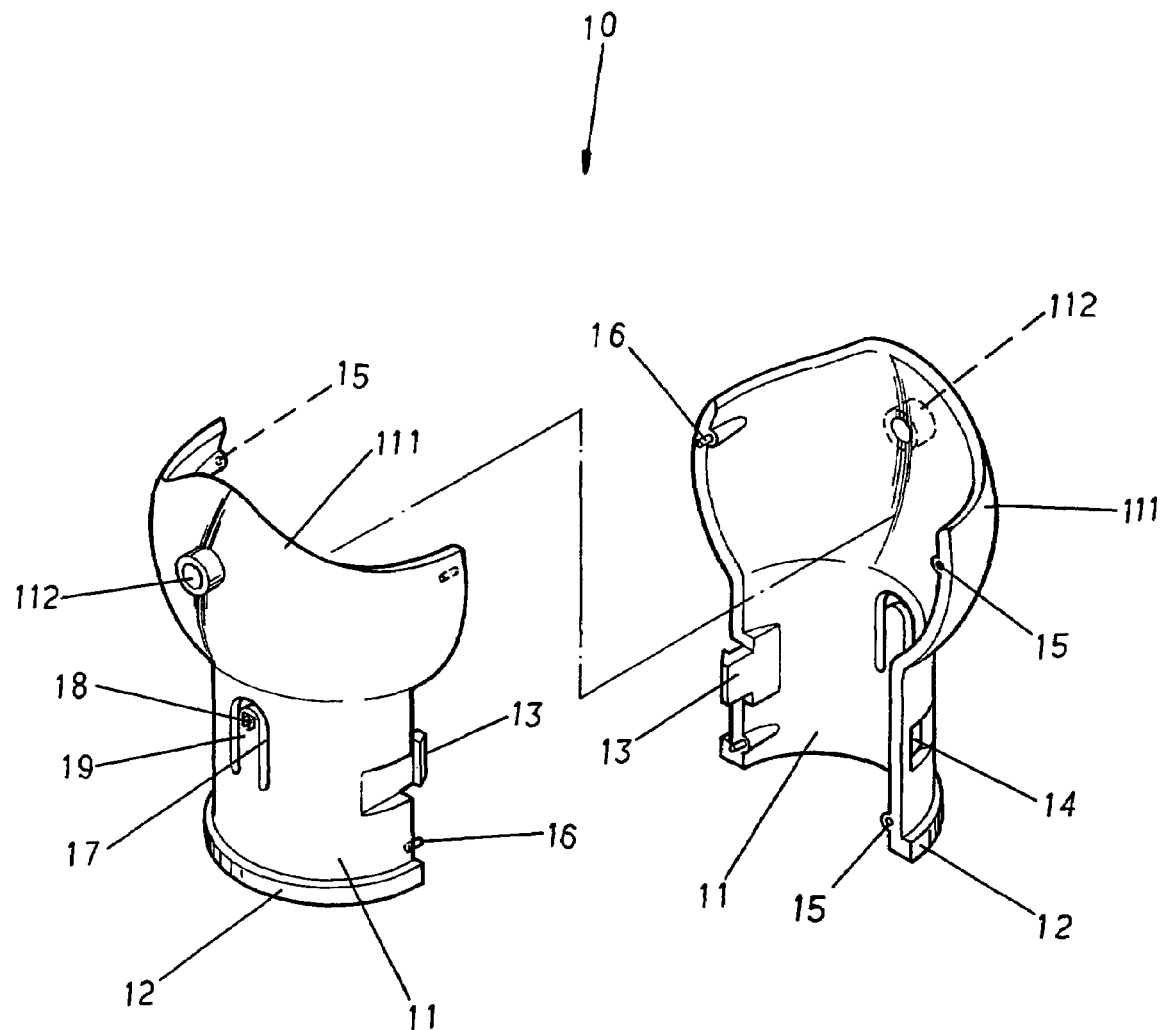
FIG. 3 is an exploded view of a first connecting unit of the angle-adjustable device in accordance with the present invention.

The first connecting unit 10 includes two half tubes 11 that are located correspondingly to each other, an upper end of each half tube 11 is provided with an arc-shaped connecting portion 111, and a protruded post 112 is protruded out of an outer surface of the arc-shaped connecting portion 111. A semi-annular flange 12 is formed at a lower end of each half tube 11, both ends of the half tube 11 are defined with an engaging block 13 and an engaging groove 14 respectively, and on both lateral edges of the respective half tubes 11 are defined with at least one positioning hole 15 and one positioning post 16 that are located correspondingly to each other, as shown in FIG. 3. The respective half tubes 11 are formed with a through groove 17, and out of one end of the through groove 17 is extended an elastic piece 19 having at least one engaging tooth 18 formed on the outer surface thereof. When assembling, the user combines the half tubes 11 together, enabling the positioning post 16 to insert into the positioning hole 15, and engages the engaging block 13 in the engaging groove 14, such that the half tubes 11 will be combined to form the first connecting unit 10.

Figure 4:
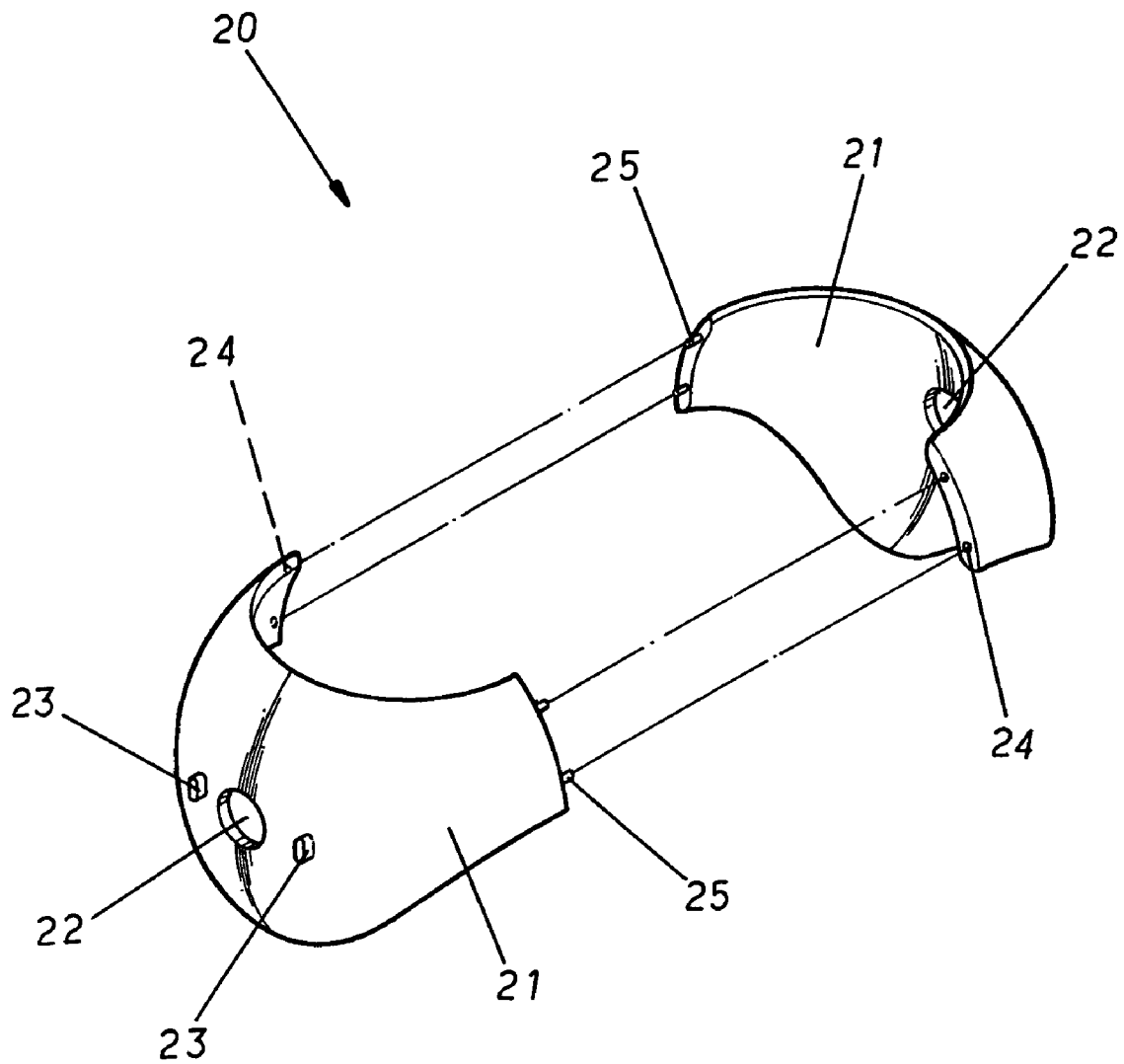
FIG. 4 is an exploded view of a linking body of the angle-adjustable device in accordance with the present invention.
Figure 6:
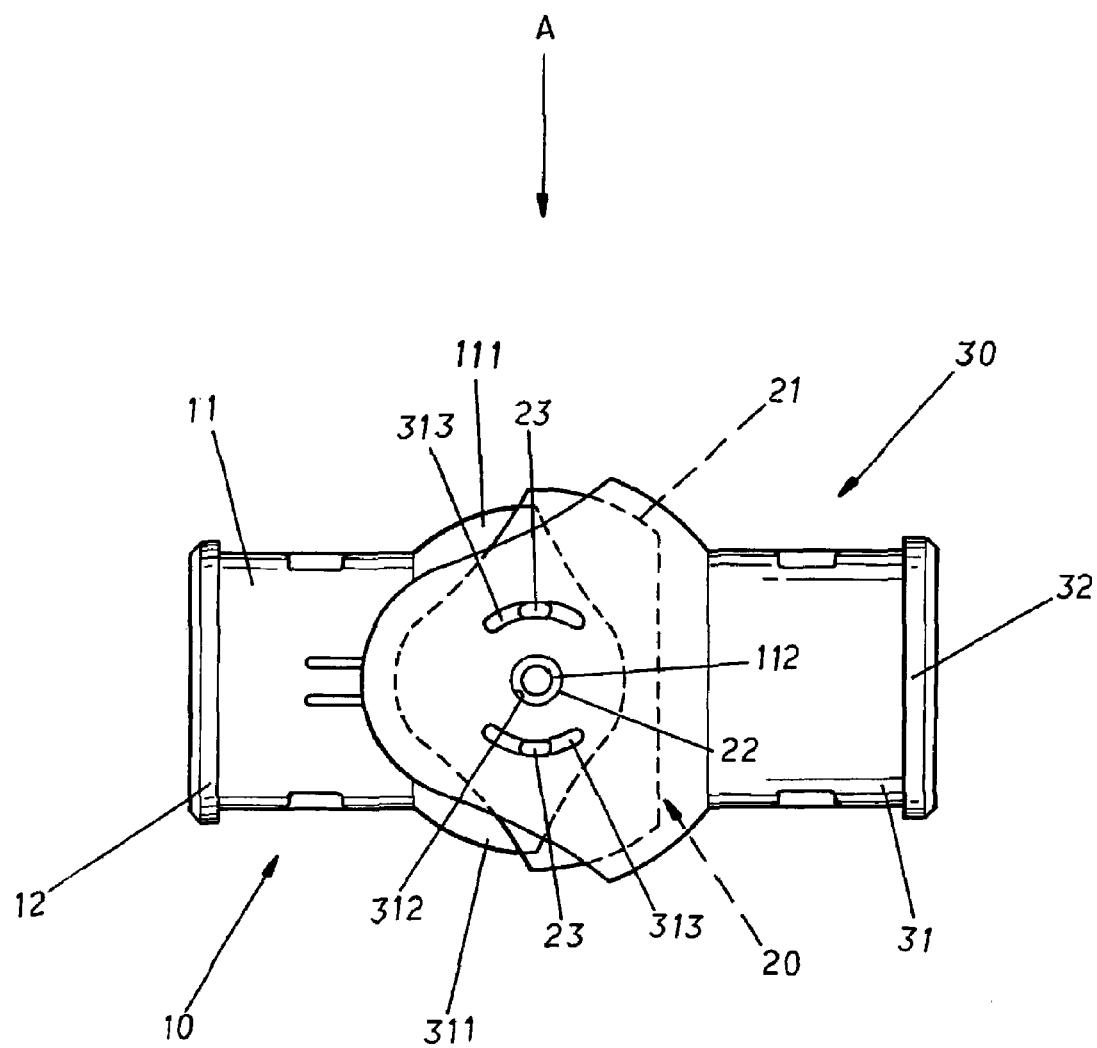
FIG. 6 is an assembly plan view of the angle-adjustable device in accordance with the present invention.

Referring to FIG. 4, the linking body 20 includes two arc-shaped members 21 that are located correspondingly to each other, and each arc-shaped member 21 is defined with a round hole 22. Two protruded blocks 23 are protruded out of a periphery of the round hole 22 and are located correspondingly to each other, and the edges of both ends of the arc-shaped member 21 are defined with at least one positioning hole 24 and one positioning post 25 that are located correspondingly to each other. When assembling, the round holes 22 of the arc-shaped members 21 are provided for insertion of the protruded posts 112 of the arc-shaped connecting portions 111 as shown in FIG. 6. The positioning post 25 is inserted into the positioning hole 24, thereby, the linking body 20 is connected to the arc-shaped connecting portions 111 of the first connecting unit 10.

Figure 5:
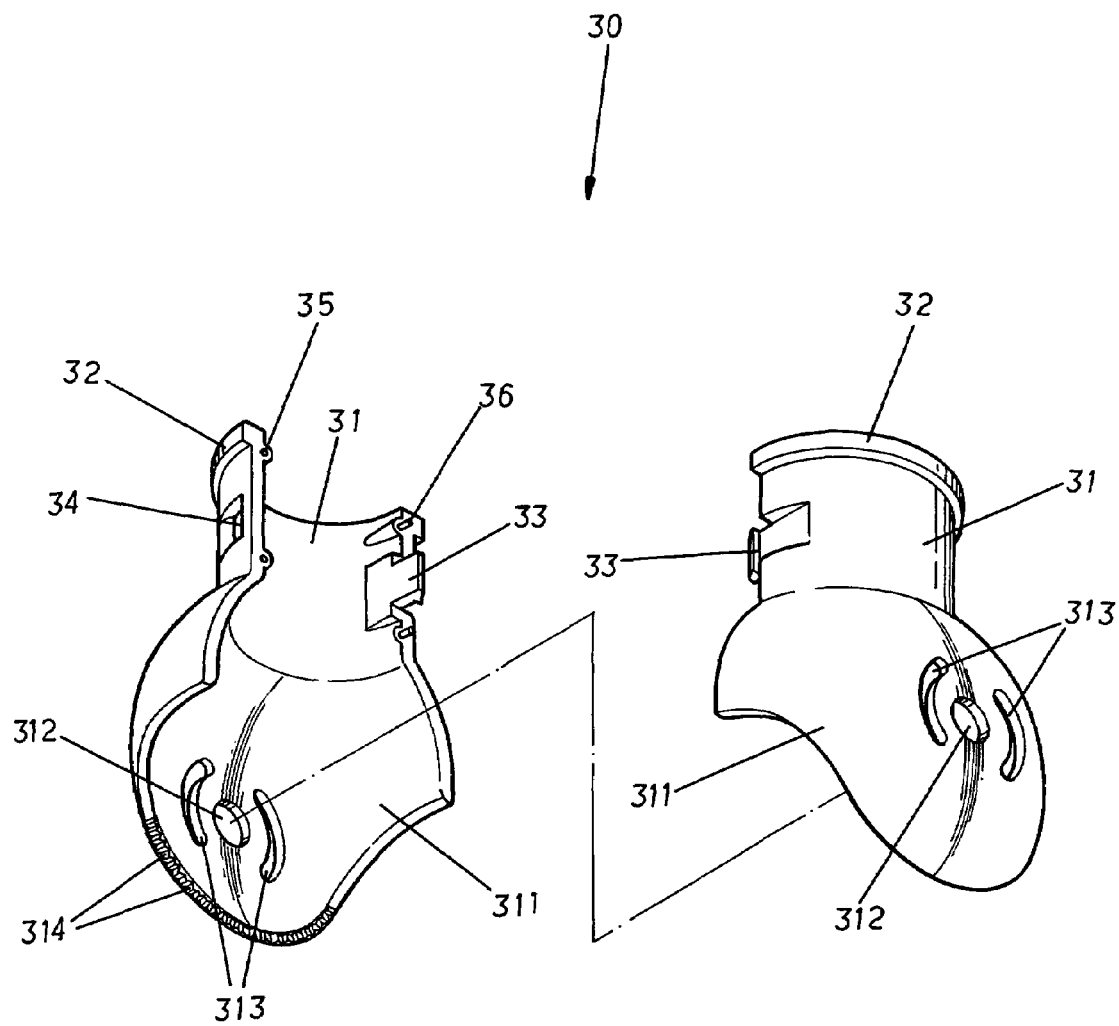
FIG. 5 is an exploded view of a second connecting unit of the angle-adjustable device in accordance with the present invention.
Figure 7:
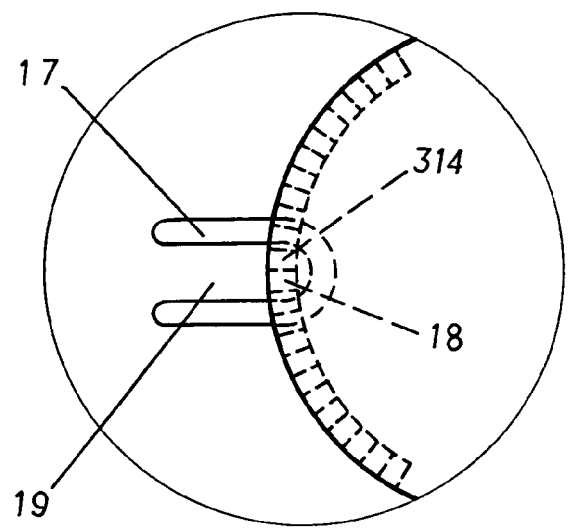
FIG. 7 is a partial enlarged view in accordance with the present invention of showing the engaging teeth and the ratchets.

With reference to FIG. 5, the second connecting unit 30 includes two half tubes 31 that are located correspondingly to each other, and a lower end of each half tube 31 is provided with a connecting portion 311. The respective connecting portions 311 is defined with a hole 312 and two guiding grooves 313 that are located correspondingly to each other, and the edge of an inner side of the connecting portion 311 is provided with a plurality of ratchets 314. A semi-annular flange 32 is formed at an upper end of each half tube 31, both ends of the half tubes 31 are defined with an engaging block 33 and an engaging groove 34 respectively, and on both lateral edges of the respective half tubes 31 are defined with at least one positioning hole 35 and one positioning post 36 that are located correspondingly to each other. When assembling, the half tubes 31 are combined together, the holes 312 are provided for insertion of the protruded posts 112 of the half tubes 11, and the protruded blocks 23 are inserted into the guiding grooves 313 respectively as shown in FIG. 6. The positioning post 36 is inserted into the positioning hole 35, the engaging block 33 is engaged in the engaging groove 34, and the engaging teeth 18 are engaged with the ratchets 314 as shown in FIG. 7, thereby, the second connecting unit 30 is connected to the linking body 20.

Figure 8:
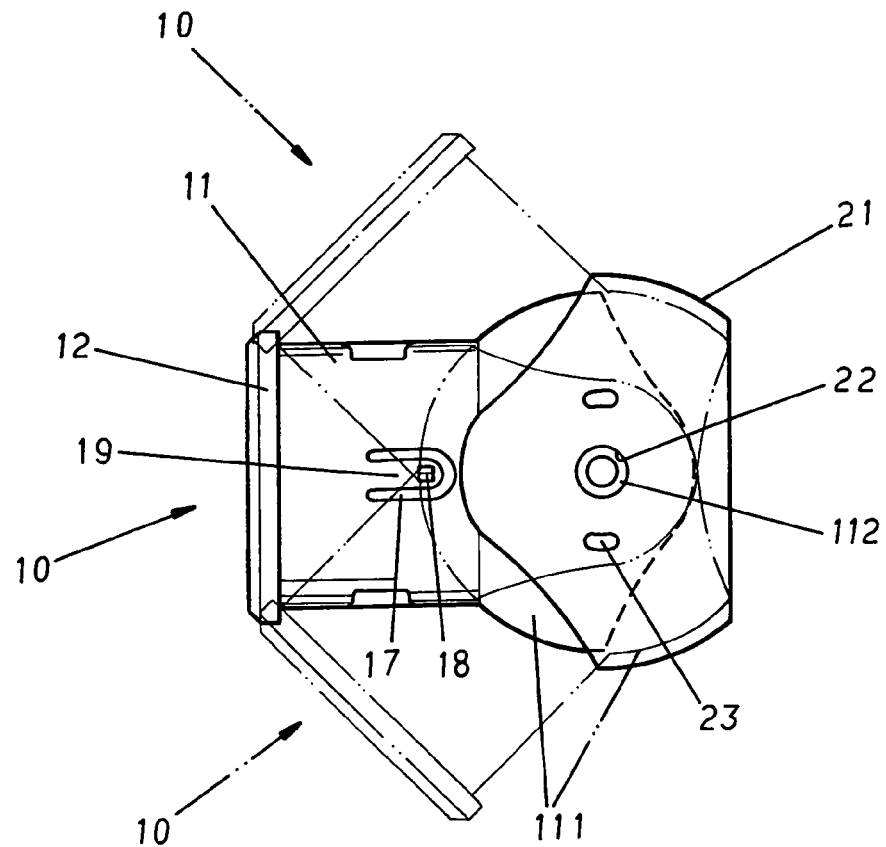
FIG. 8 is another assembly plan view in accordance with the present invention of showing the first connecting unit and the linking body.
Figure 9:
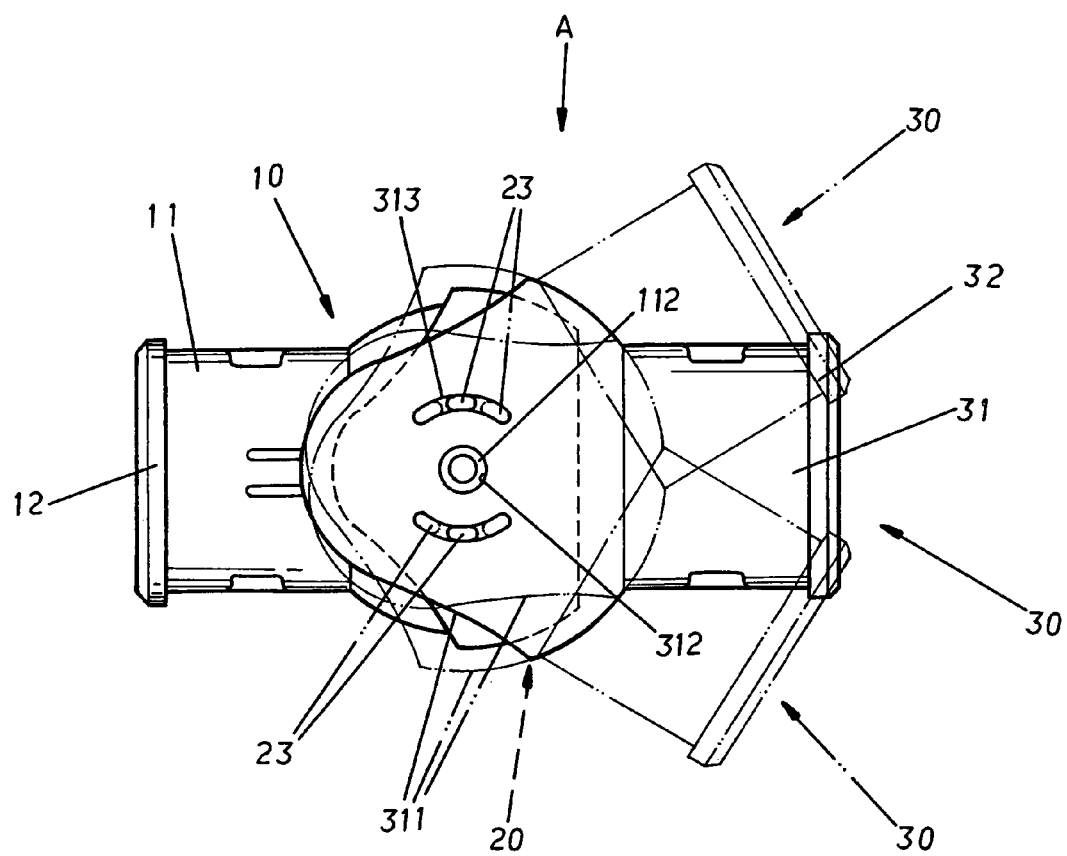
FIG. 9 is a rotating assembly plan view in accordance with the present invention of showing the second connecting unit.
Figure 10:
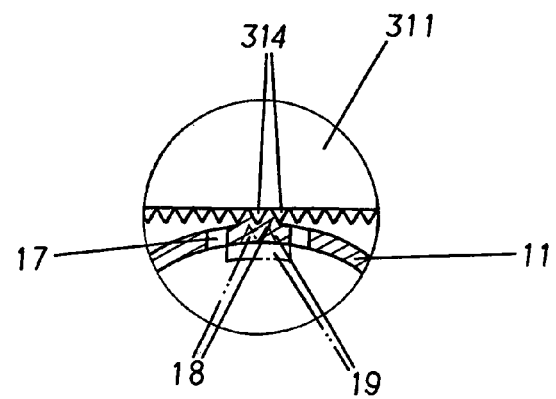
FIG. 10 is a cross sectional view in accordance with the present invention of showing the engaging teeth and the ratchets.

When using, the first connecting unit 10 and the second connecting unit 30 of the angle-adjustable device A are connected to a first tube and a second tube respectively (not shown) to form a pipe, such that the pets can play in the pipe. When adjusting the angle between the first tube and the second tube, the first connecting unit 10 is rotated along the round hole 22 by the protruded post 112 as shown in FIG. 8 so as to adjust the angle between the first connecting unit 10 and the first tube. Similarly, the second connecting unit 30 is rotated along the hole 312 by the protruded post 112 as shown in FIG. 9 so as to adjust the angle between the second connecting unit 30 and the second tube. Since the protruded blocks 23 are inserted into the guiding grooves 313, the rotating angle of the second connecting unit 30 can be restricted. When the first connecting unit 10 and the second connecting unit 30 are not rotating, one of the ratchets 314 of the second connecting unit 30 is engaged with the engaging tooth 18 of the first connecting unit 10 as shown in FIG. 10, thus fixing the first and the second connecting unit 10 and 30.

Since the engaging teeth 18 are formed on an elastic piece 19, the engaging teeth 18 are engaged with the ratchets 314 stably.

To summarize, the angle between the first tube and the second tube of the angle-adjustable device A are adjustable, so the angle of the forming pipe is adjustable, the play of the pets (such as mouse) in the pipe can be changed.

While we have shown and described various embodiments in accordance with the present invention, it should be clear to those skilled in the art that further embodiments may be made without departing from the scope of the present invention.

What is claimed is:

1. An angle-adjustable device between two tubes used as a play place for pets, comprising:

a first connecting unit having two protruded posts and an engaging tooth;

a linking body being connected to the first connecting unit and defined with two round holes for insertion of the protruded posts of the first connecting unit; and a second connecting unit being connected to the linking body and defined with two holes and a plurality of ratchets, the holes being provided for insertion of the protruded posts of the first connecting unit, and the ratchets being provided for engaging with the engaging tooth of the first connecting unit.

2. The angle-adjustable device between two tubes used as a play place for pets as claimed in claim 1, wherein the linking body includes a protruded block, and the second connecting unit includes a guiding groove for insertion of the protruded block.

3. The angle-adjustable device between two tubes used as a play place for pets as claimed in claim 1, wherein the first connecting unit includes an elastic piece for disposing the engaging tooth.

4. The angle-adjustable device between two tubes used as a play place for pets as claimed in claim 3, wherein the first connecting unit includes two half tubes, each half tube is defined with an engaging block and an engaging groove that are located correspondingly to each other, and the engaging block is engaged with the engaging groove.

5. The angle-adjustable device between two tubes used as a play place for pets as claimed in claim 1, wherein the second connecting unit includes two half tubes, each half tube is defined with an engaging block and an engaging groove that are located correspondingly to each other, and the engaging block is engaged with the engaging groove.

6. The angle-adjustable device between two tubes used as a play place for pets as claimed in claim 1, wherein the linking body includes two arc-shaped members, each arc-shaped member is defined with a positioning post and a positioning hole that are located correspondingly to each other, and the positioning post is inserted into the positioning hole.

7. The angle-adjustable device between two tubes used as a play place for pets as claimed in claim 4, wherein each half tube of the first connecting unit is defined with a positioning post and a positioning hole that are located correspondingly to each other, and the positioning post is inserted into the positioning hole.

8. The angle-adjustable device between two tubes used as a play place for pets as claimed in claim 5, wherein each half tube of the second connecting unit is defined with a positioning post and a positioning hole that are located correspondingly to each other, and the positioning post is inserted into the positioning hole.

* * * * *